(12) United States Patent
Sher-Jan et al.

(10) Patent No.: US 8,763,133 B2
(45) Date of Patent: *Jun. 24, 2014

(54) SYSTEMS AND METHODS FOR MANAGING DATA INCIDENTS

(71) Applicants: Mahmood Sher-Jan, Lake Oswego, OR (US); Susan M. Rook, Beaverton, OR (US); Greg L. Kotka, Vancouver, WA (US)

(72) Inventors: Mahmood Sher-Jan, Lake Oswego, OR (US); Susan M. Rook, Beaverton, OR (US); Greg L. Kotka, Vancouver, WA (US)

(73) Assignee: Identity Theft Guard Solutions, LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/691,661

(22) Filed: Nov. 30, 2012

(65) Prior Publication Data

US 2013/0212692 A1 Aug. 15, 2013

Related U.S. Application Data

(63) Continuation of application No. 13/396,558, filed on Feb. 14, 2012.

(51) Int. Cl.
*H04L 29/06* (2006.01)
(52) U.S. Cl.
USPC ............................................. 726/25; 726/26

(58) Field of Classification Search
USPC ......... 726/1, 25, 26, 28–30; 706/52; 713/182, 713/193
See application file for complete search history.

(56) References Cited

U.S. PATENT DOCUMENTS

| | | | |
|---|---|---|---|
| 7,996,374 B1 * | 8/2011 | Jones et al. | 707/694 |
| 8,185,931 B1 * | 5/2012 | Reeves | 726/1 |
| 8,332,959 B2 * | 12/2012 | Chen et al. | 726/30 |
| 2004/0098285 A1 * | 5/2004 | Breslin et al. | 705/1 |
| 2004/0193907 A1 * | 9/2004 | Patanella | 713/200 |
| 2007/0136814 A1 * | 6/2007 | Lee et al. | 726/25 |

OTHER PUBLICATIONS

Non-Final Office Action issued in U.S. Appl. No. 13/396,558 mailed Apr. 9, 2013.

* cited by examiner

*Primary Examiner* — Hadi Armouche
*Assistant Examiner* — Hee Song
(74) *Attorney, Agent, or Firm* — Carr & Ferrell LLP

(57) ABSTRACT

Systems and methods for managing a data incident are provided herein. Exemplary methods may include receiving data breach data that comprises information corresponding to the data breach, automatically generating a risk assessment from a comparison of data breach data to privacy rules, the privacy rules comprising at least one federal rule and at least one state rule, each of the rules defining requirements associated with data breach notification laws, and providing the risk assessment to a display device that selectively couples with the risk assessment server.

26 Claims, 15 Drawing Sheets

SYSTEMS AND METHODS FOR MANAGING DATA INCIDENTS

CROSS-REFERENCE TO RELATED APPLICATIONS

The present continuation application claims the benefit and priority of U.S. Non-Provisional patent application Ser. No. 13/396,558 filed on Feb. 14, 2012 titled "Systems and Methods for Managing Data Incidents", which is hereby incorporated by reference.

FIELD OF THE TECHNOLOGY

Embodiments of the disclosure relate to information privacy. More specifically, but not by way of limitation, the present technology relates to the management of data incidents. The management of a data incident may comprise conducting an analysis of a data incident data relative to federal and state privacy rules and generating a risk assessment and incident response plan for the data incident. Additionally, the present technology may generate notification schedules and gather/transmit notification information for data incidents having a risk assessment that is indicative of a high level of risk.

BACKGROUND OF THE DISCLOSURE

Data incidents involve the exposure of sensitive information such as personally identifiable information and protected health information to third parties. Data incidents may comprise data breaches, privacy breaches, privacy or security incidents, and other similar events that result in the exposure of sensitive information to third parties. Some of these exposures may be subject to numerous state and federal statutes that delineate requirements that are to be imposed upon the party that was entrusted to protect the data. Personally identifiable information (hereinafter, "PII") and protected health information (hereinafter, "PHI"), which regard healthcare-related information for individuals that are maintained by a covered entity (e.g., an entity that has been entrusted with the PHI such as a hospital, clinic, health plan, and so forth), may include, but are not limited to, healthcare, financial, political, criminal justice, biological, location, and/or ethnicity information. For purposes of brevity, although each of these types of PII and PHI may have distinct nomenclature, all the aforementioned types of information will be referred to herein as PII/PHI.

SUMMARY OF THE DISCLOSURE

According to some embodiments, the present technology may be directed to methods managing a data incident. The methods may comprise: (a) receiving, via a risk assessment server, data incident data that comprises information corresponding to the data incident; (b) automatically generating, via the risk assessment server, a risk assessment from a comparison of data incident data to privacy rules, the privacy rules comprising at least one federal rule and at least one state rule, each of the rules defining requirements associated with data incident notification laws; and (c) providing, via the risk assessment server, the risk assessment to a display device that selectively couples with the risk assessment server.

According to other embodiments, the present technology is directed to a risk assessment server for managing a data incident. In some instances, a risk assessment server may comprise: (a) a memory for storing executable instructions; (b) a processor for executing the instructions; (c) an input module stored in memory and executable by the processor to receive data incident data, the data incident data comprising information corresponding to the data incident; (d) a risk assessment generator stored in memory and executable by the processor to generate a risk assessment from a comparison of the data incident data to privacy rules, the privacy rules comprising at least one federal rule and at least one state rule, each of the rules defining requirements associated with data incident notification laws; and (e) a notification module stored in memory and executable by the processor to provide the risk assessment to a display device that selectively couples with the risk assessment server.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 3 illustrates an exemplary graphical user interface (GUI) in the form of a data incident details page;

FIG. 4 illustrates an exemplary GUI in the form of a data incident dashboard;

FIG. 7 illustrates an exemplary GUI in the form of a federal risk assessment page;

DETAILED DESCRIPTION

Figure 1:
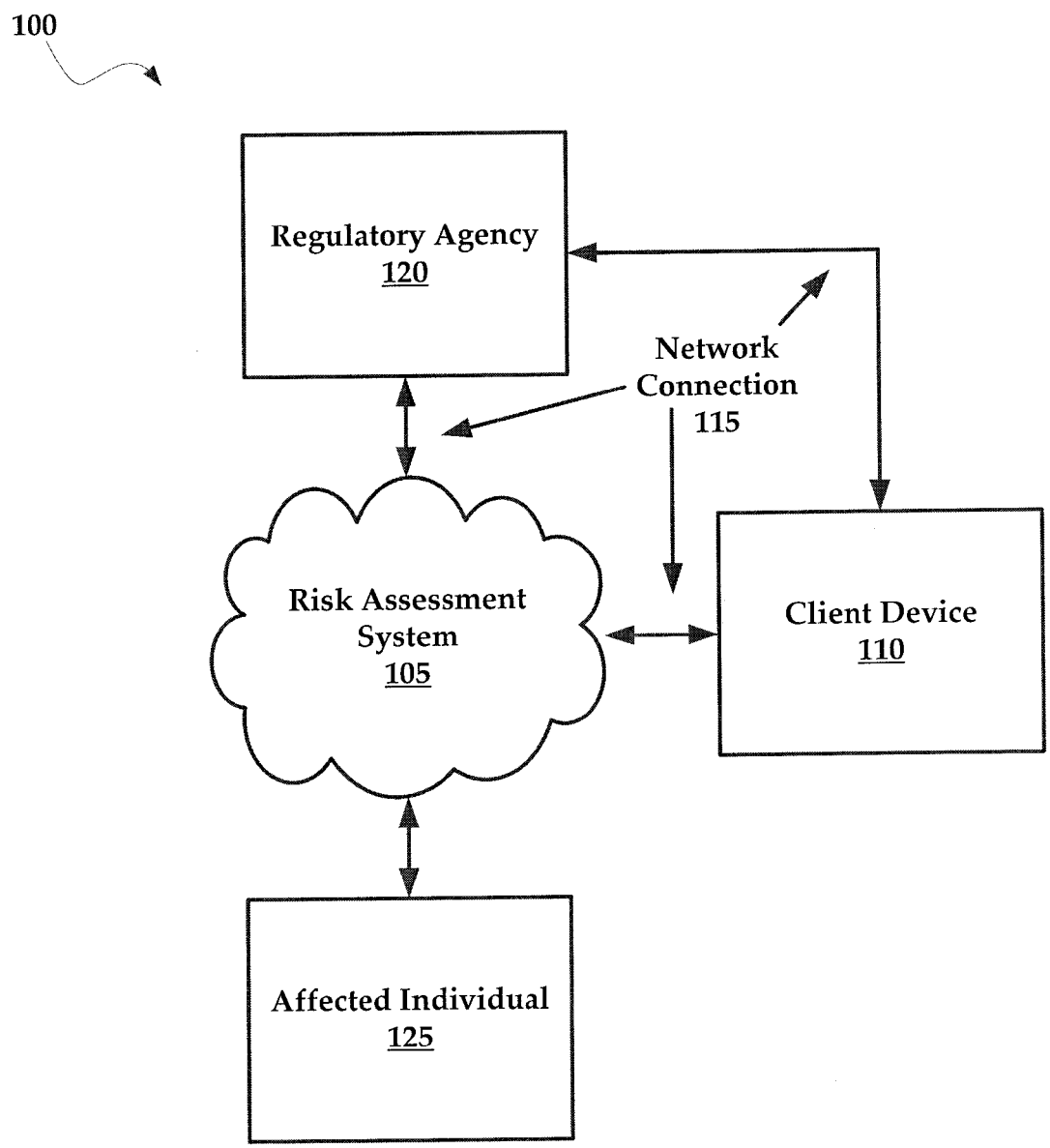
FIG. 1 illustrates an exemplary system for practicing aspects of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Generally speaking, the present technology may be directed to managing data incidents. It will be understood that the terms "data incident" may be understood to encompass privacy incidents, security incidents, privacy breaches, data breaches, data leaks, information breaches, data spills, or other similarly related events related to the intentional or unintentional release of protected information to an untrusted environment. This protected information may be referred to as personally identifiable information (hereinafter "PII/PHI") or protected health information (e.g., an entity that has been entrusted with the PHI such as a hospital, clinic, health plan, and so forth).

PII/PHI may encompass a wide variety of information types, but non-limiting examples of PII comprise an individual's full name, a date of birth, a birthplace, genetic information, biometric information (face, finger, handwriting, etc.), national identification number (e.g., social security), vehicle registration information, driver's license numbers, credit card numbers, digital identities, and Internet Protocol addresses.

Other types of information may, in some instances, be categorized as PII/PHI, such as an individual's first or last name (separately), age, residence information (city, state, county, etc.), gender, ethnicity, employment (salary, employer, job description, etc.), and criminal records—just to name a few. It is noteworthy to mention that the types of information that are regarded as PII are subject to change and therefore may include more or fewer types of information that those listed above. Additionally, what constitutes PII/PHI may be specifically defined by a local, state, federal, or international data privacy laws.

While entities that are subject to these privacy laws may be referred to in a variety of ways, for consistency and clarity an entity (either individual or corporate) that is entrusted with PII/PHI will hereinafter be referred to as an "entrusted entity."

It will be understood that the privacy laws contemplated herein may comprise details regarding not only how an entrusted entity determines if a data incident violates the law, but also when the provision of notification to one or more privacy agencies and/or the customers of the entrusted entity is warranted.

According to some embodiments, the present technology is directed to generating risk assessments for data incidents. These risk assessments provides specific information to the entrusted entity regarding the severity of the data incident relative to a state or federal rule. Additionally, the risk assessment provides information regarding the data sensitivity for the data incident. That is, the risk assessment may determine if the type of data that was exposed is highly sensitive information. As mentioned before, some PII/PHI may be considered more sensitive than others. For example, a social security number may be more sensitive than a gender description, although the relative sensitivity for different categories of PII/PHI are typically delineated in the privacy rules and may require delineation in the context of each data incident.

The present technology may determine the severity and/or data sensitivity for a data incident by collecting data incident data from an entrusted entity. This data incident data may be compared against one or more selected privacy rules to determine the severity and/or data sensitivity for the data incident. In some instances, the present technology may model the data incident data to the one or more privacy rules.

According to some embodiments, the privacy rules described herein may comprise the content of a state and/or federal statute. In other embodiments, the privacy rules may comprise abstracted or mathematically expressed rules that have been generated from the text of the state and/or federal statute. Applying a privacy rule to the data incident data may yield values for the severity and/or the data sensitivity of the data incident.

In some embodiments, the risk assessment may provide indication to the entrusted entity that an obligation has occurred. More specifically, if the severity of the data incident and/or the data sensitivity of the data incident when compared to the privacy rules indicates that the data incident has violated at least one of the privacy rules, the risk assessment may include an indication that an obligation has been created. An obligation may require the entrusted entity to notify subjected individuals that their PII/PHI has been potentially exposed. The obligation may also require that notification be provided to a regulating authority such as the department of Health and Human Services (HHS), Office for Civil Rights (OCR), Federal Trade Commission, a state agency, or any agency that regulates data incident notification.

The present technology allows entrusted entities to model data incident data to privacy rules which include at least one state rule and at least one federal rule. In some instances, entrusted entities may model data incidents to the rules of several states to generate risk assessments of each of the states. This is particularly helpful when entrusted entities service customers in many states. Moreover, each of these states may have differing notification requirements, along with different metrics for determining when a data incident requires notification.

In some embodiments, the risk assessment may include a risk level that is associated with a color. More specifically, a hue of the color is associated with the severity of the data incident as determined by the comparison or modeling if the data incident data.

According to the present disclosure, the present technology may generate a notification schedule for an entrusted entity along with mechanisms that aid the entrusted entity in gathering pertinent information that is to be provided to the customer and/or one or more regulator agencies.

These and other advantages of the present technology will be described in greater detail with reference to the collective FIGS. 1-15.

FIG. 1 illustrates an exemplary system 100 for practicing aspects of the present technology. The system 100 may include a risk assessment system, hereinafter "system 105" that may be implemented in a cloud-based computing environment, or as a web server that is particularly purposed to manage data incidents.

In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the system 105 may include a distributed group of computing devices, such as web servers, that do not share computing resources or workload. Additionally, the system 105 may include a single computing device, such as a web server, that has been provisioned with one or more programs that are utilized to manage data incidents.

End users may access and interact with the system 105 via the client device 110 through a web-based interface, as will be discussed in greater detail infra. Alternatively, end users may access and interact with the system 105 via a downloadable program that executes on the client device 110. The system 105 may selectively and communicatively couple with a client device 110 via a network connection 115. The network connection 115 may include any one of a number of private and public communications mediums, such as the Internet.

Additionally, the system 105 may collect and transmit pertinent information to regulatory agencies, such as regulatory agency 120, as will be discussed in greater detail infra. In some instances, notification may also be provided to affected individuals 125.

The system 105 may be generally described as a mechanism for managing data incidents. The system 105 may manage a data incident by collecting data incident data for the data incident and then modeling the data incident data to privacy rules. As mentioned previously, the privacy rules may include at least one state rule and at least one federal rule. The modeling of the data incident data may be utilized to generate a risk assessment for the data incident. The risk assessment may be utilized by an entrusted entity to determine how best to respond to the data incident. The system 105 is provided with a risk assessment application 200 that will be described in greater detail with reference to FIG. 2.

Figure 2:
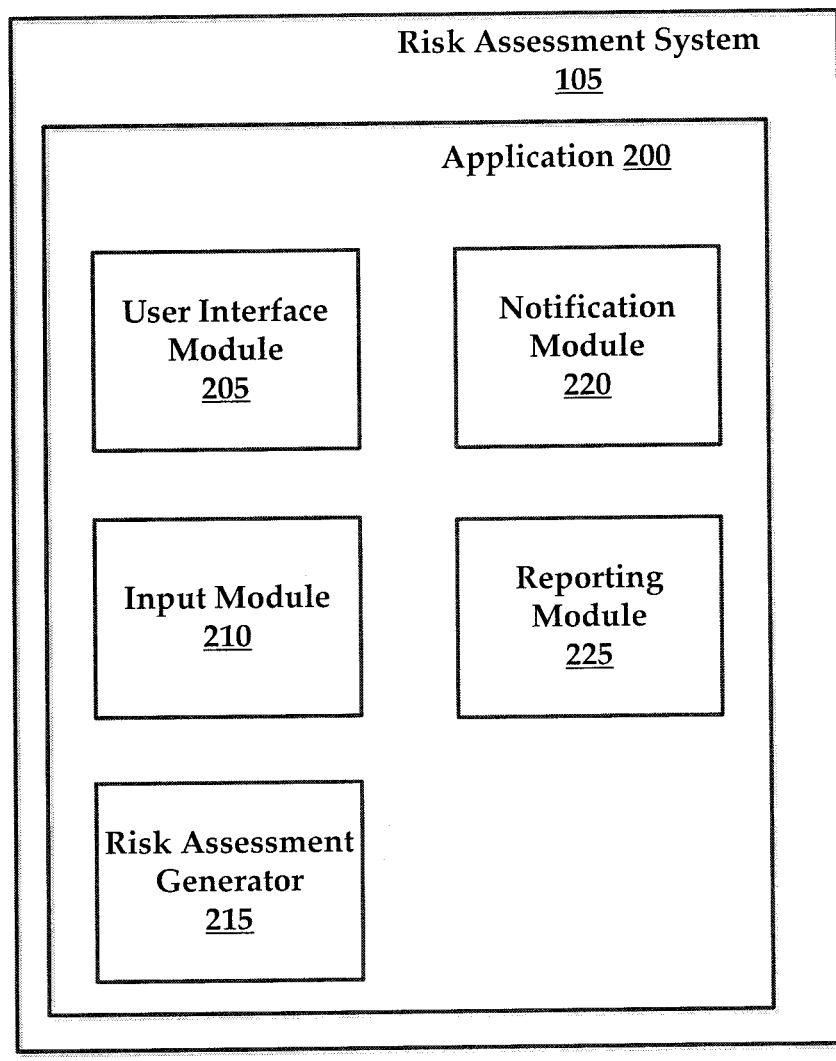
FIG. 2 illustrates an exemplary conversion application for managing data incidents.

FIG. 2 illustrates a risk assessment application, hereinafter referred to as application 200. In accordance with the present disclosure, the application 200 may generally include a user interface module 205, an input module 210, a risk assessment generator 215, a notification module 220, and a reporting module 225. It is noteworthy that the application 200 may include additional modules, engines, or components, and still fall within the scope of the present technology. Moreover, the functionalities of two or more modules, engines, generators, or other components may be combined into a single component.

As used herein, the terms "module," "generator," and "engine" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the application 200 may include separately configured web servers. Also, the application 200 may be provisioned with a cloud.

Generally described, the application 200 allows entrusted entities to input data incident data, have one or more risk assessments generated, and receive the one or more risk assessments, along with notifications schedules, as required.

An entrusted entity may interact with the application 200 via a graphical user interface that is provisioned as a web-based interface. The web-based interface may be generated by the user interface module 205. It will be understood that the user interface module 205 may generate a plurality of different graphical user interfaces that allow individuals associated with the entrusted entity (e.g., privacy officer, compliance officer, security officer, attorney, employee, agent, etc.) to utilize interact with the application 200. Examples of graphical user interfaces that are generated by the user interface module 205 are provided in FIGS. 3-13, which will be described in greater detail infra.

Upon the occurrence of a data incident, the input module 210 may be executed to receive data incident data from the entrusted entity. It is noteworthy that the user interface module 205 may generate different types of graphical user interfaces that are tailored to obtain specific types of data incident data from the entrusted entity.

Initially, it may be desirable for the entrusted entity to establish a profile that may be utilized to determine if the entity that is using the application 200 is, in fact, an entrusted entity. It is noteworthy to mention that the determination of which entities are entrusted entities depends upon the privacy rule. For example, an entity may be considered to be an entrusted entity under a particular federal statute, but may not be labeled an entrusted entity under one or more state statutes. Likewise, different states may have discrepant methods for determining who constitutes an entrusted entity.

Therefore, it may be advantageous to determine information about the entity such as what types of information they collect and where they conduct business. The input module 210 may be executed to solicit pertinent information from the entity that may be utilized to determine if the entity is an entrusted entity. Again, the entity may specify a plurality of states in which they conduct business, or the states of residence/domicile for customers with which they conduct business.

If it is determined that the entity is an entrusted entity, the input module may further solicit data incident data for one or more data incidents. Pertinent data incident data may include the type of data that was compromised, the date of compromise, the amount of data that was compromised, were there security measures in place (e.g., encryption, redaction, etc.), was the incident intentional or unintentional, was the incident malicious or non-malicious, how the data was compromised (e.g., theft of laptop, database security failure, lost storage media, hacked application, hacked computing device (e.g., web server, email server, content repository, etc.), and other types of information that assist in determining a risk level for the data incident as well as any notification obligations.

In some instances, rather than soliciting generalized data incident data from the entrusted entity, the input module 210 may select questions that solicit data that is particularly relevant to the privacy rules to which the entrusted entity is subject. For example, if a privacy rule specifies that a threshold amount of records must be exposed in order to create an obligation, the end user may be asked if their amount of exposed records meets or exceeds that threshold amount. This type of tailored questioning narrows the analysis that is performed of the data incident data and improves the efficiency of the risk assessment process.

Once the data privacy data has been received, the input module 210 may generate a summary of the data privacy data (or at least a portion of the data) that is provided to the entrusted entity via a graphical user interface generated by the user interface module 205.

The input module 210 may be configured to solicit confirmation from the entrusted entity that the data privacy data in the summary is correct. If the data is incorrect, the entrusted entity may go back and correct the errant data.

As mentioned briefly above, the input module 210 may solicit and receive one or more selections of one or more states from the entrusted entity. Using the selections, the input module 210 may select one or more state statutes based upon the one or more selections. Also, the input module 210 may generate at least one state rule for each selected state statute. Additionally, one or more federal rules may be selected and generated as well.

The input module 210 may generate a state or federal privacy rule by evaluating the state/federal statute and creating a plurality of qualifications from the statutes. Qualifications for a statute may include, for example, thresholds or formulas that are used to determine if the data incident data of a data incident violates the statute. Stated otherwise, these qualifications may be used as a mathematical model of a statute. Data incident data may be evaluated in light of the model. The resultant modeling may be used to generate a risk assessment for the data incident.

The risk assessment generator 215 may be executed to generate one or more risk assessments for the data incident. The risk assessment generator 215 may model the data incident data to the selected or determined privacy rules to determine if an obligation has been triggered under a privacy rule.

Again, risk assessments may be generated by modeling the data incident data to at least one state rule and at least one federal rule. The risk assessment may combine risk levels for each rule into a single risk assessment, or individual risk assessments may be generated for each rule.

Modeling of the data incident data to a privacy rule (either state or federal) by the risk assessment generator 215 may result in the generation of a severity value and a data sensitivity value for the data incident. The severity value may represent the extent to which PII/PHI has been compromised, while the data sensitivity value may represent the relative sensitivity of the PII/PHI that was compromised. These two factors may independently or dependently serve as the basis for determining if a notification obligation exists. For example, if the severity value meets or exceeds a threshold amount, a notification obligation may exist. If the data sensitivity value meets or exceeds a threshold amount, a notification obligation may exist. In some instance, a notification obligation may only exist if the sensitivity value and the data sensitivity value both exceed threshold amounts. Again, the threshold amounts are specified by the particular privacy rule that is being applied to the data incident data.

The risk assessment generator 215 may also determine and apply exceptions that exist in a state or federal statute during the generation of a risk assessment. These exceptions may be noted and included in the risk assessment.

Figure 7:
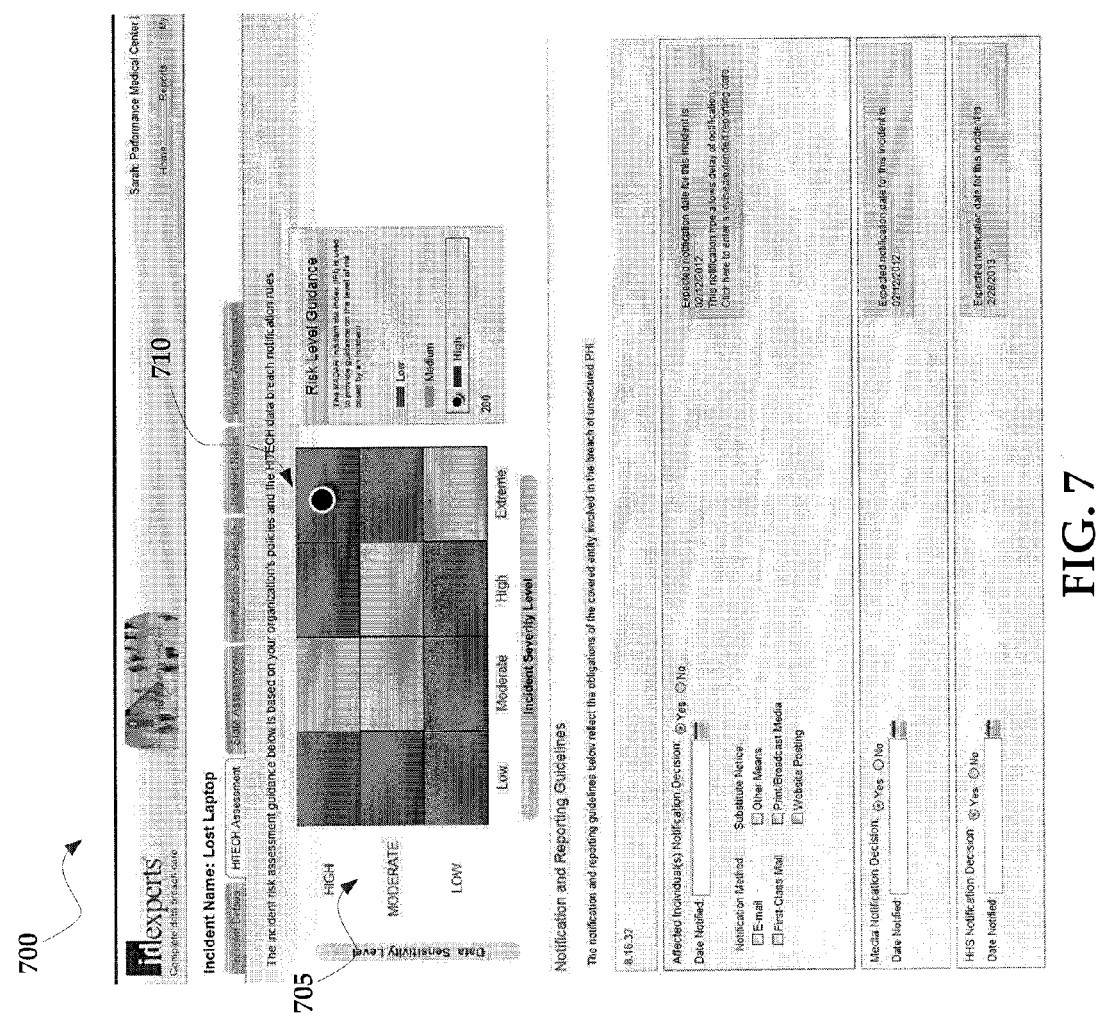

The risk assessment generator 215 may create a visual indicator such as a risk level or heat map that assists the entrusted entity in determining whether a data incident is relatively severe or relatively benign. This visual indicator may be included in the risk assessment. For example, a risk assessment may include a risk level that includes a visual indicator, such as a colored object. In some embodiments, a hue of the object is associated with the severity of the data incident, where red may indicate a severe risk and green may indicate a benign risk, with orange or yellow hues falling somewhere in between. Examples of heat maps and risk level indicators are illustrated in FIG. 7.

Included in the risk assessment, in some instances, is a summary of sections of the state or federal privacy statute. For example, with regard to a state specific assessment, the risk assessment generator 215 may generate an outline of key information about the state statute that was utilized to generate the state specific risk assessment. This outline may be displayed to the entrusted entity via a user interface.

If the risk assessment generator 215 determines that the data incident violates one or more statutes (e.g., high severity value, PII/PHI is very sensitive, etc.), the notification module 220 may be executed to generate a notification schedule. The notification schedule may be generated based upon a data associated with the data incident. That is, the statute may specify when notification is to occur, relative to the date that PII was exposed.

Additionally, the notification schedule informs the entrusted entity as to what types of information are to be provided, along with the regulatory bodies to which the information should be provided. Again, the notification schedule may be generated from the statute itself. For example, a statute may specify that the data incident data (or a portion of the data incident data) collected by the input module 210 should be provided to a particular state agency within a predetermined period of time. Again, if a plurality of states have been designated or selected, the notification schedule may include notification dates for each state agency.

To assist the entrusted entity in meeting their notification obligations, the reporting module 225 may be executed to gather pertinent documents or other information from the entrusted entity and transmit these documents to the required reporting authorities. The reporting module 225 may prompt the entrusted entity to attach documents via a user interface. Once attached, these documents/data may be stored in a secured repository for submission to regulatory agency. In other instances, the entrusted entity may transmit required information directly to the regulatory agency.

Additionally, the reporting module 225 may provide required notifications to affected individuals, such as the individuals associated with the PII/PHI that was compromised.

FIGS. 3-13 illustrate various exemplary graphical user interfaces (GUI) that are generated by the user interface module 205. Each of the exemplary user interfaces will be described below.

Figure 3:
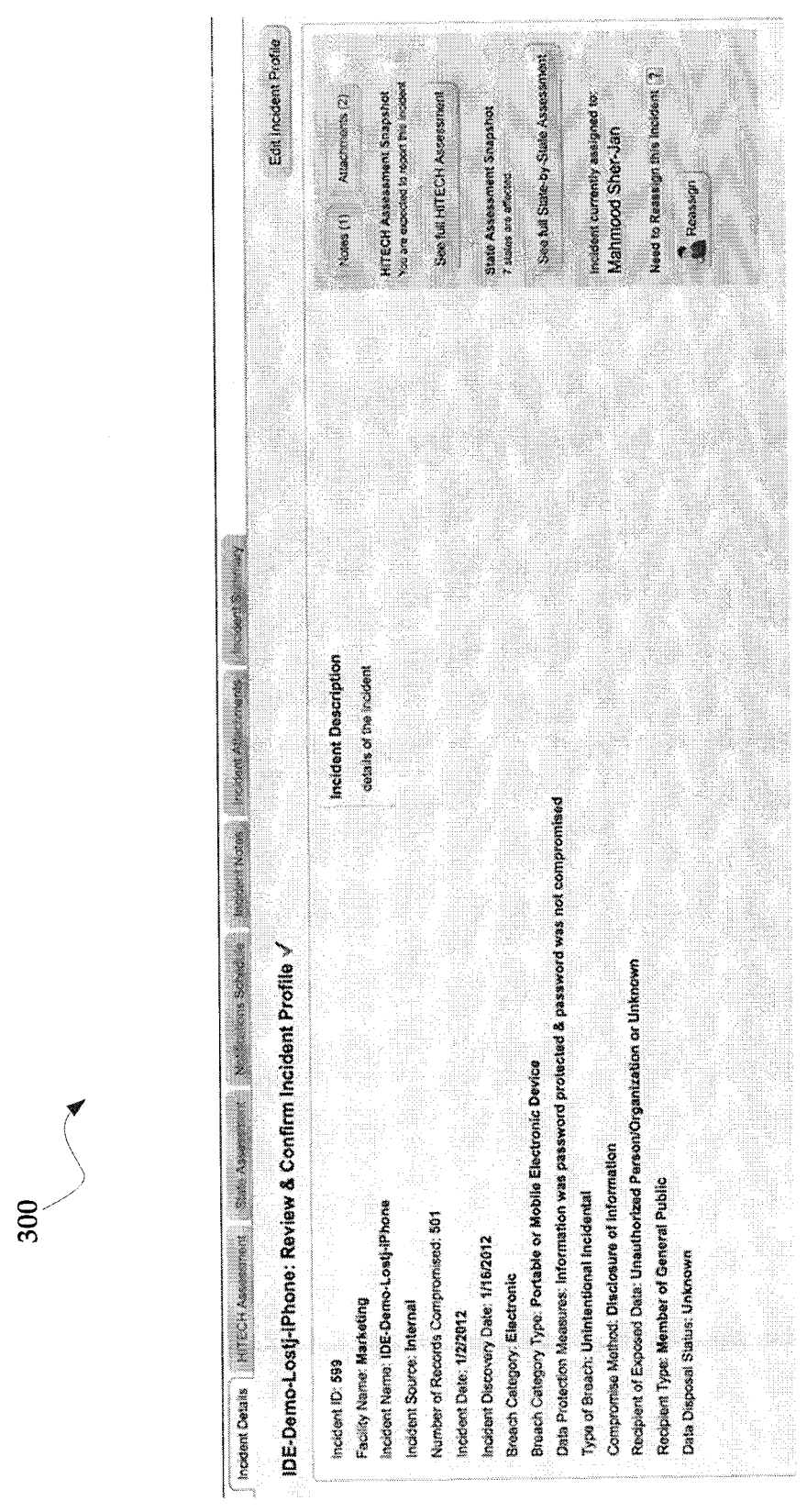

FIG. 3 illustrates an exemplary GUI in the form of a data incident summary page. The summary page 300 includes a plurality of received answers to questions that were provided to the entrusted entity. Responses that were received indicate that the data incident involved the loss of a cellular telephone, an incident date of Jan. 2, 2012, an incident discover date of Jan. 16, 2012, and other pertinent data incident data.

Figure 4:
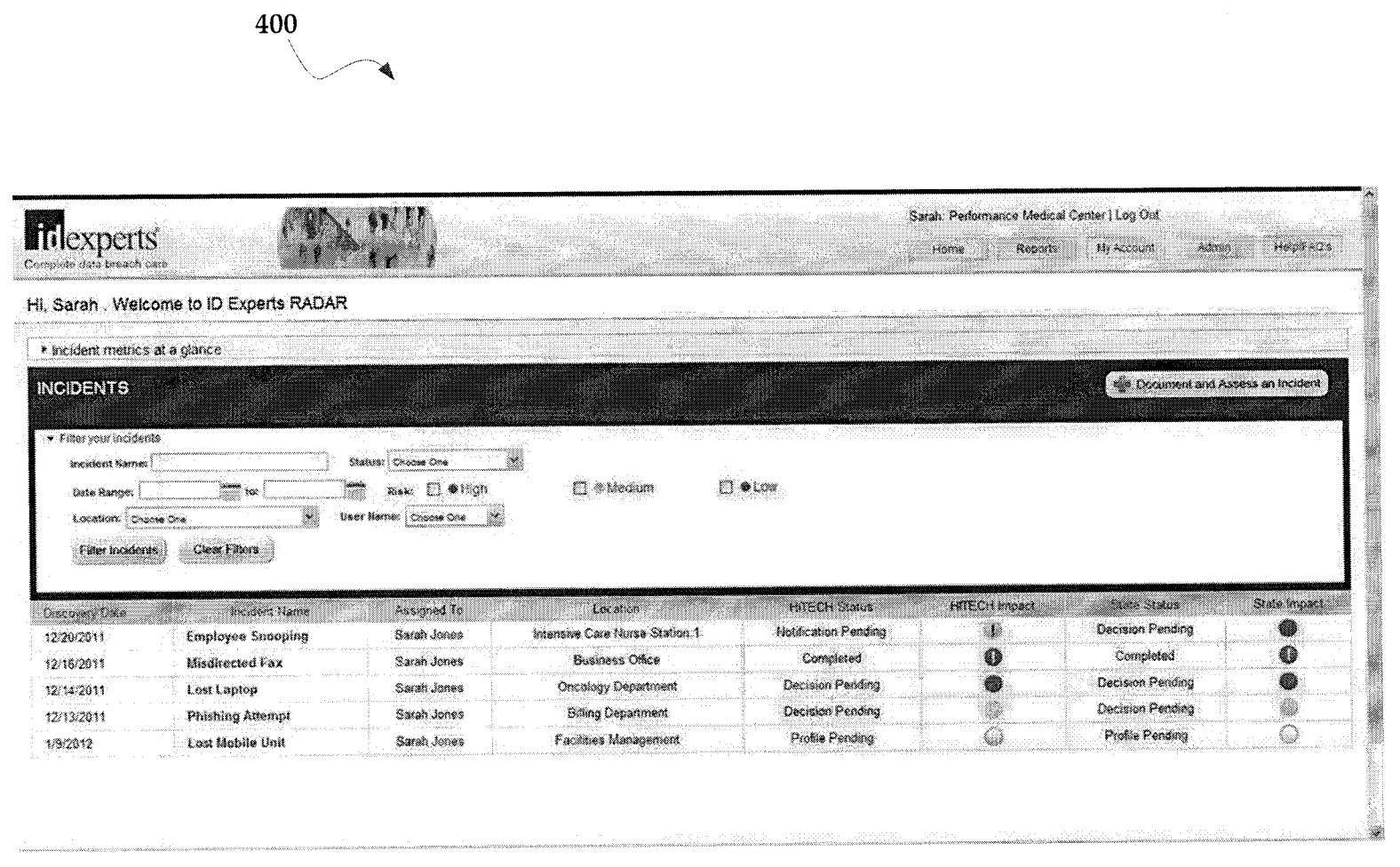

FIG. 4 illustrates an exemplary GUI in the form of a data incident dashboard page 400. The page 400 includes listing of pending and completed risk assessments for a plurality of data incidents. Each entry may include a risk indicator having a particular color to help the entrusted entity in quickly determining data incidents that are high risk. A risk indicator may be associated with a particular privacy rule. For example, a risk indicator for an Employee Snooping data incident indicates that a moderately high risk is associated with the data incident relative to HITECH rules (e.g., rules associated with the compromise of PHI). This moderately high risk is indicated by a yellow dot placed within a row of a "HITECH Status" column. Additionally, a severe risk is associated with a state privacy rule. This severe risk is indicated by a red dot placed within a row of a "State Impact" column.

Figure 5:
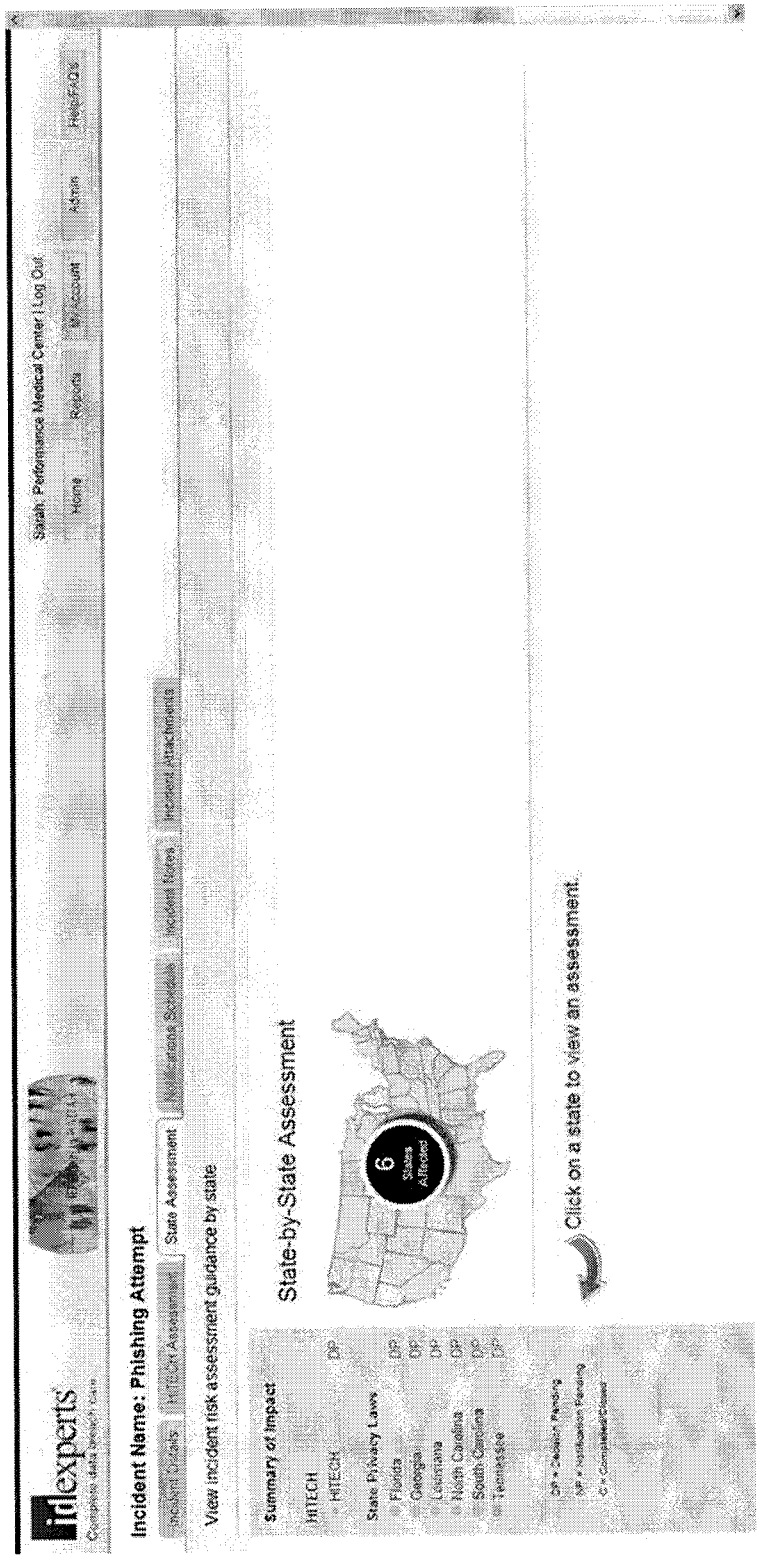
FIG. 5 illustrates an exemplary GUI in the form of a state specific risk assessment selection and notification page.

FIG. 5 illustrates an exemplary GUI in the form of a state specific selection and notification page 500. The notification page is shown as comprising an image that informs the trusted entity that six states have been affected by the data incident. To view a risk assessment for each state, the trusted entity may click on any of the stated listed in the leftmost frame.

Figure 6:
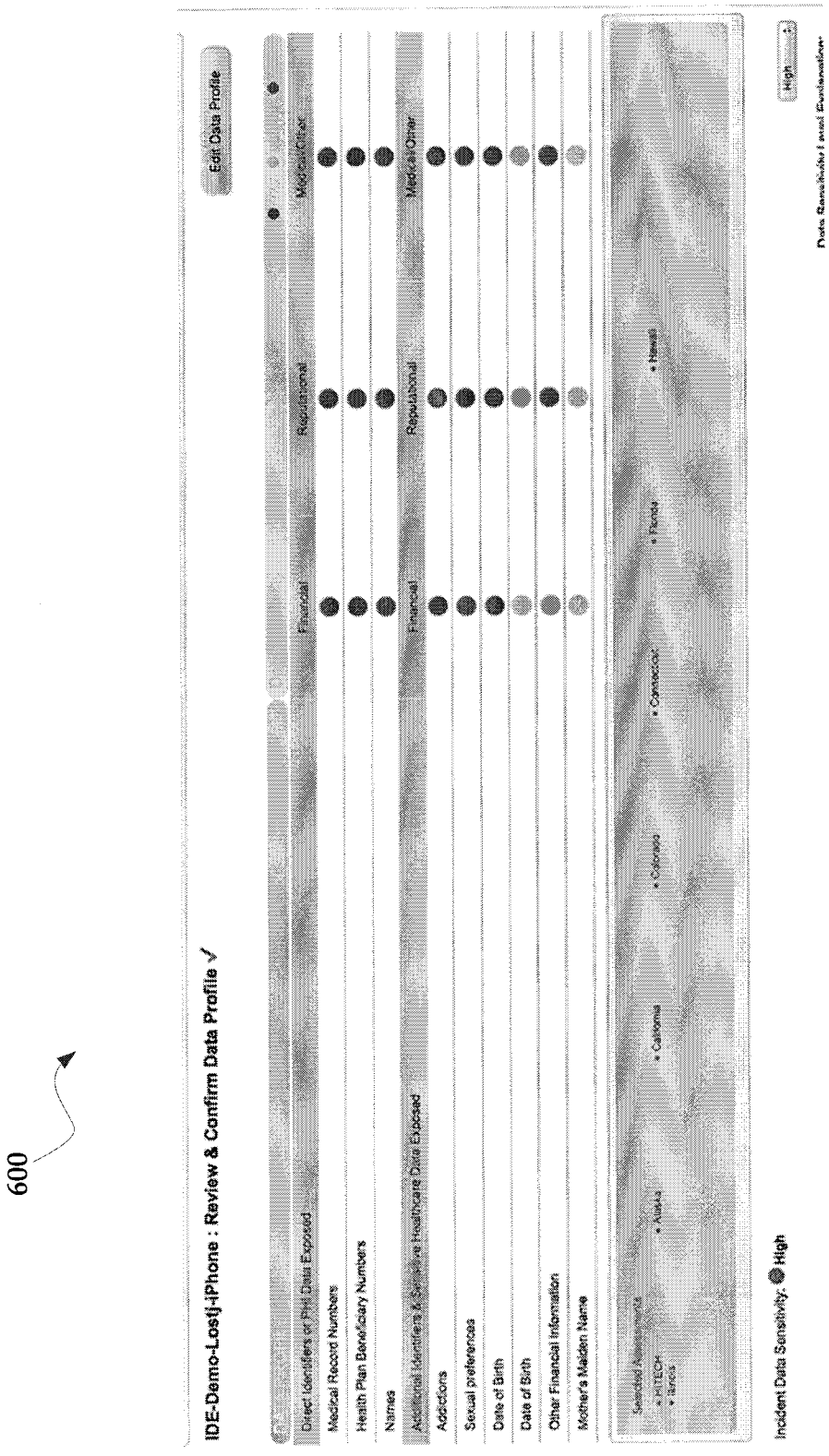
FIG. 6 illustrates an exemplary GUI in the form of a data sensitivity level evaluation and selected federal and state specific risk assessments page.

FIG. 6 illustrates an exemplary GUI in the form of a data sensitivity level evaluation page 600. The page includes a plurality of data sensitivity indicators the sensitivity for different types of PII/PHI that were compromised by the data incident. For example, medical record numbers are shown in red as being highly sensitive. Moreover, medical record numbers may pose financial, reputational, and medical harm, which are just some of the dimensions of potential harm caused by compromise of PII/PHI. In contrast, the data incident also compromised individual's date of birth. As determined by entrusted entity, that type of PII/PHI is not considered highly sensitive and thus, has been depicted in green.

FIG. 7 illustrates an exemplary GUI in the form of a risk assessment page 700. The risk assessment page 700 includes a heat map 705 and corresponding risk level indicator 710, which is placed within the heat map 705. The heat map 705 includes a grid where vertical placement indicates data sensitivity level and horizontal placement indicates severity level. As is shown, as the sensitivity and severity levels increase, so do the odds that the data incident may trigger an obligation to notify affected parties. In this instance, the risk level is high because the sensitivity level is high and the severity level is extreme.

Positioned below the heat map 705 is a notification schedule that includes not only the obligations for the entrusted entity, but also the expected notification dates. Again, this schedule may be based upon requirements included in the violated statute.

Figure 8:
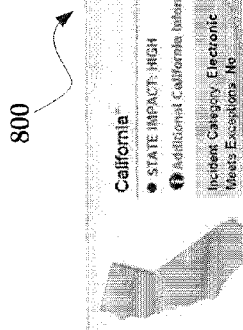
FIG. 8 illustrates an exemplary GUI in the form of a state specific risk assessment page.

FIG. 8 illustrates an exemplary GUI in the form of a state specific risk assessment page 800. The page 800 includes a risk assessment for the State of California. The state impact is shown as high and a summary of the types of PII/PHI that were exposed are summarized below the state impact indicator. Similarly to the risk assessment page 700 of FIG. 7, a notification schedule is included on the state specific risk assessment page 800. It is noteworthy that a state specific risk assessment page may be generated for each affected state (such as the affected states listed on the state specific selection and notification page 500 of FIG. 5.

Figure 9:
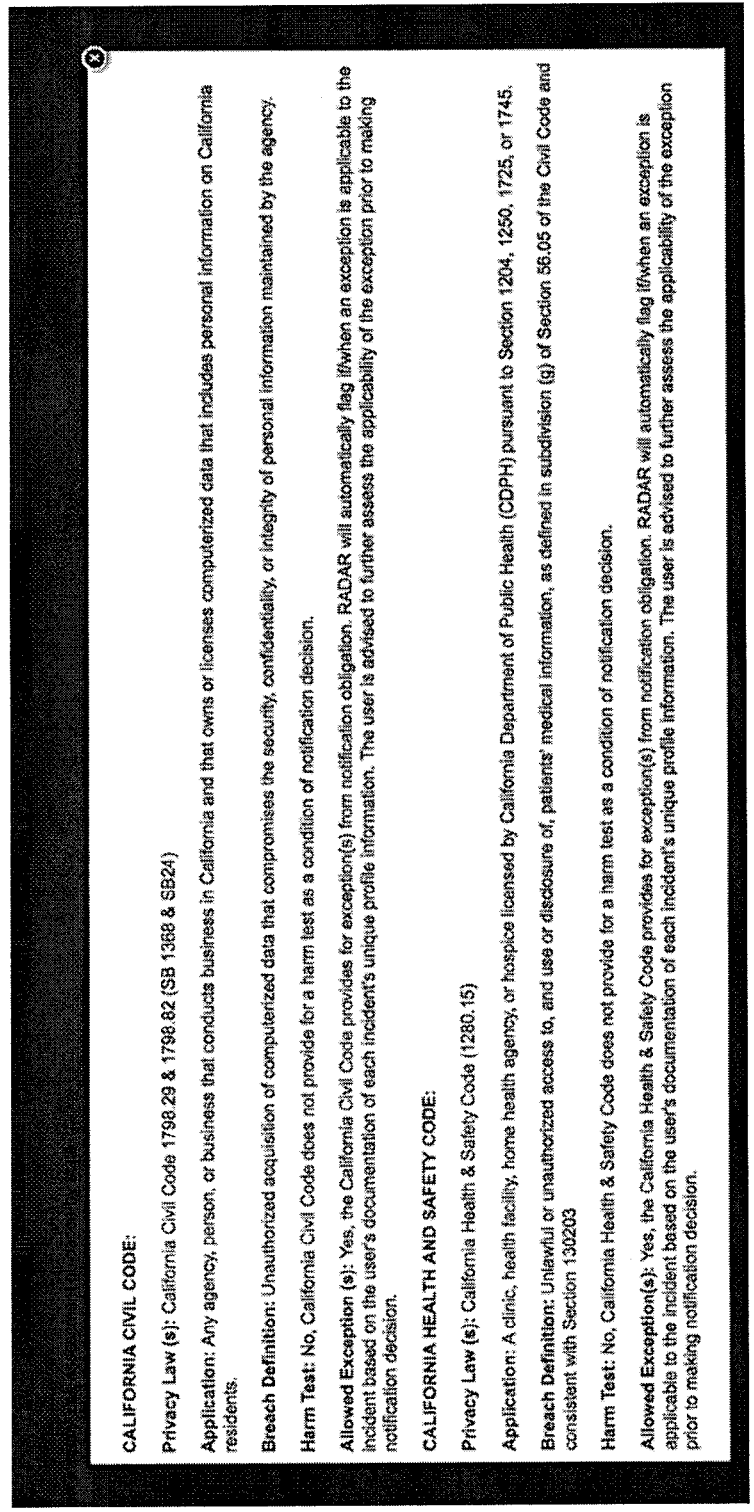
FIG. 9 illustrates an exemplary GUI in the form of a statute summary page.

FIG. 9 illustrates an exemplary GUI in the form of a statute summary page 900. The statute summary page 900 includes a copy (or a portion) of the privacy statutes (California Civil Code 1798.29 & 1798.82; California Health and Safety Code 1280.15) that were utilized to generate the state specific risk assessment that was provided on in FIG. 8. Note that the summary also includes whether the state statutes include harm test and exceptions which are flagged by the risk assessment generator 215 according to the specific privacy statutes.

Figure 10:
FIG. 10 illustrates an exemplary GUI in the form of an aggregated notification schedules page.

FIG. 10 illustrates an exemplary GUI in the form of an aggregated notification page 1000. The page 1000 includes a notification schedule for each affected privacy statues (e.g., federal and state(s)) relative to one or more data incidents. A list of notification events is provided and the end user may utilize the check boxes to select which states (or federal) risk assessment notification schedules are displayed.

Figure 11:
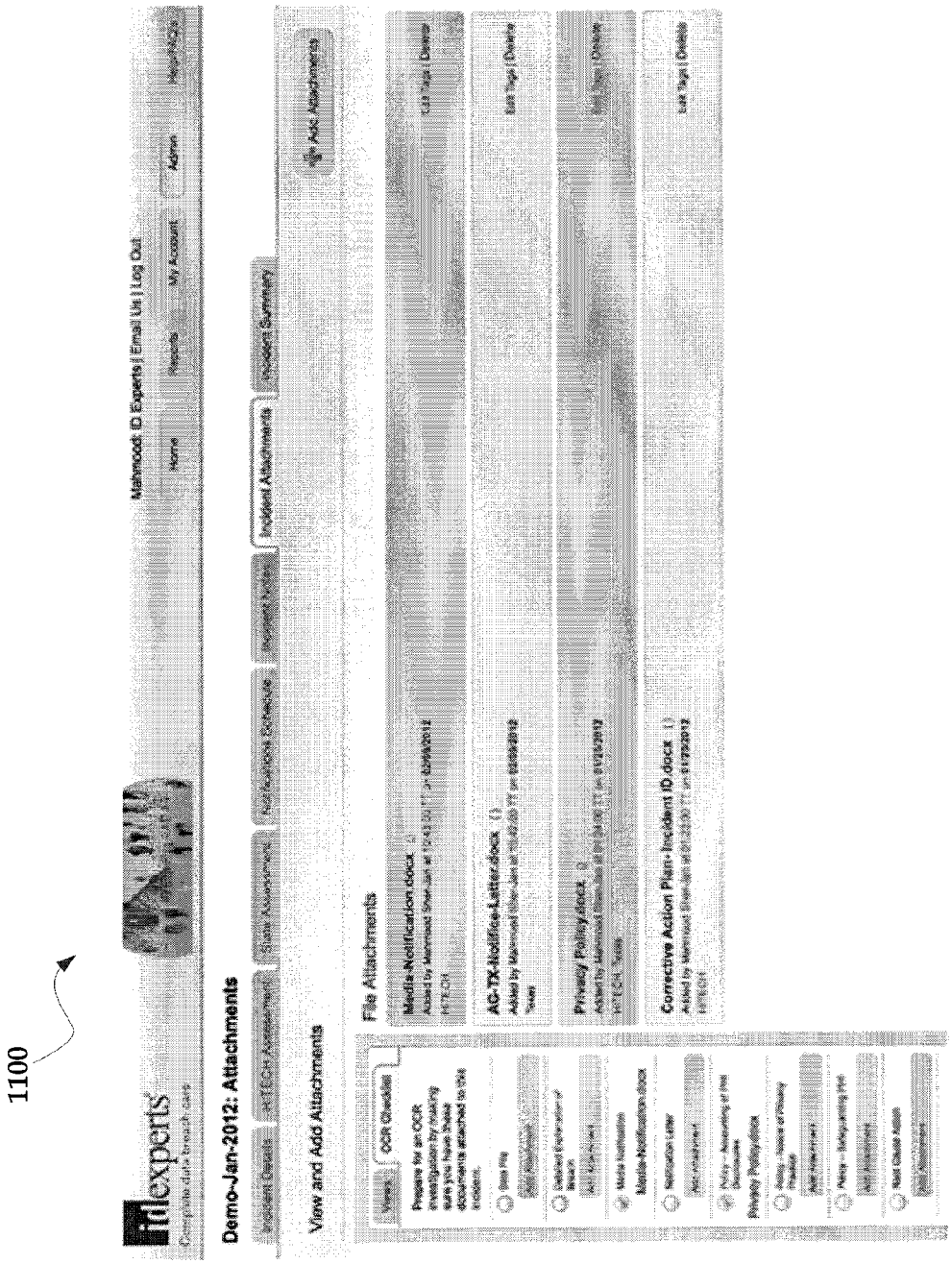
FIGS. 11-13 illustrate exemplary GUIS that are utilized to collect, store, and transmit pertinent documents or data.
Figure 12:
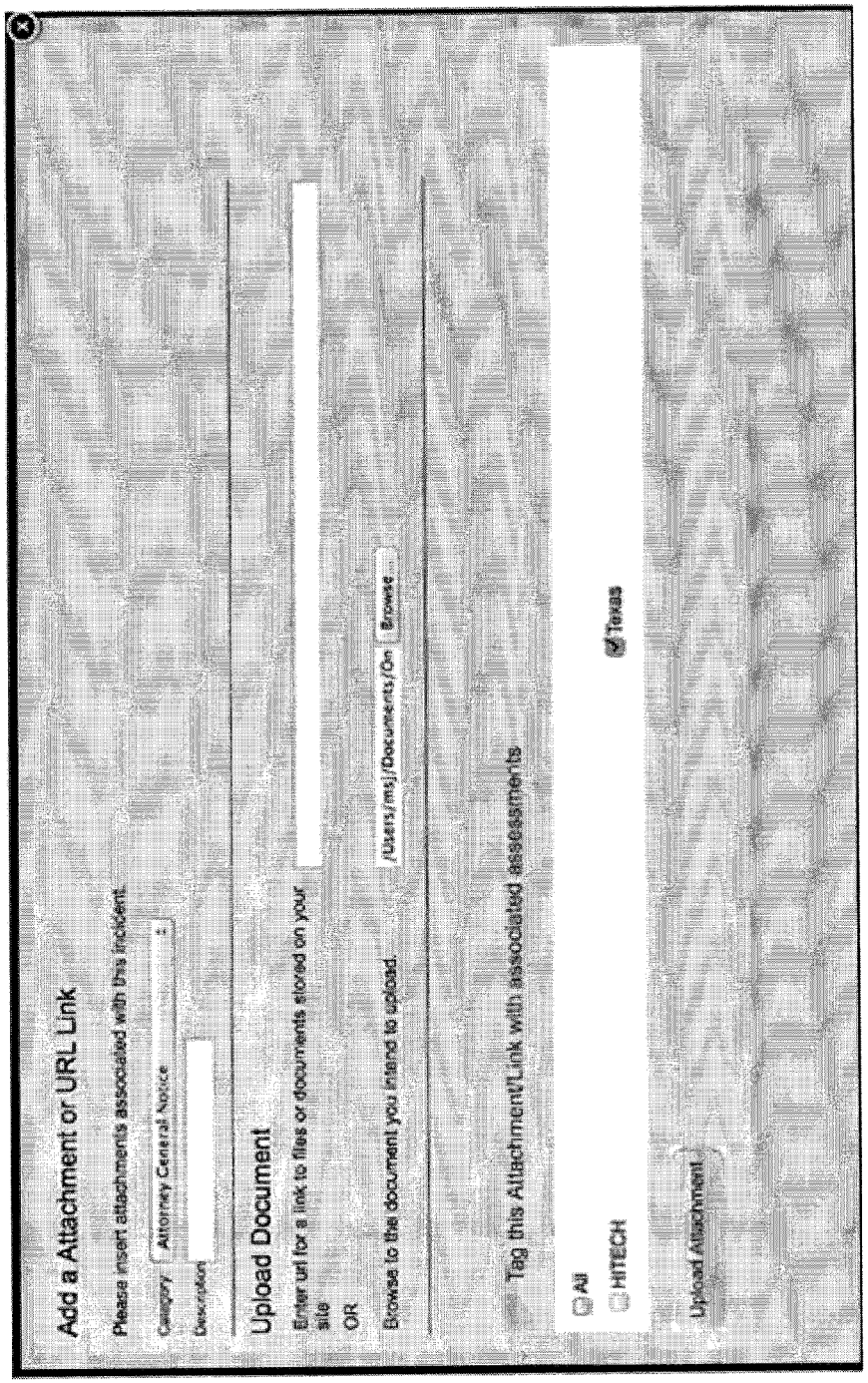
Figure 13:
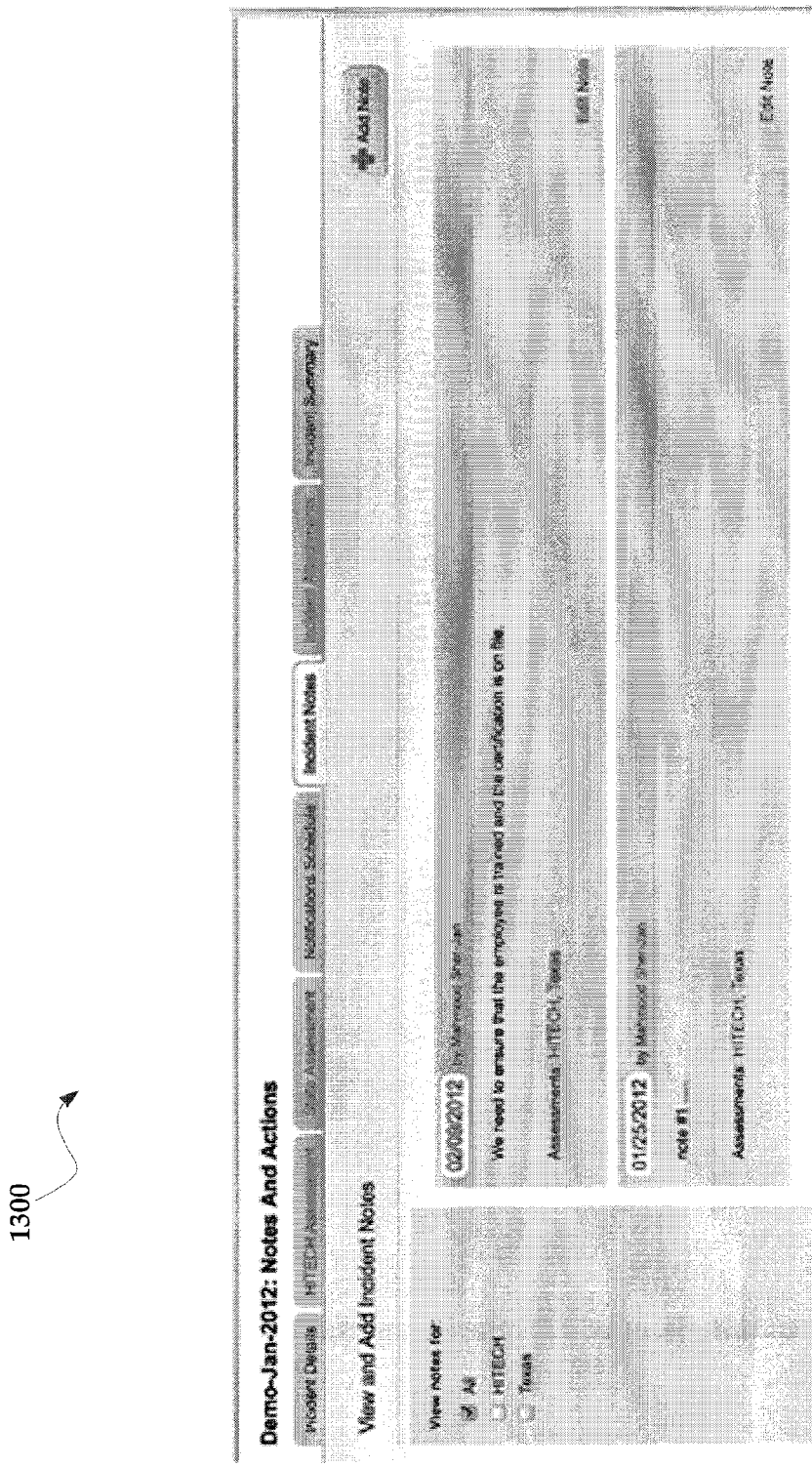

FIGS. 11-13 illustrate exemplary GUIS that are utilized to collect, store, and transmit pertinent documents or data. FIG. 11 illustrates an attachments page 1100 that shows a plurality of documents that have been uploaded to the system, such as media notification, attorney general notification, privacy policy, and corrective action plan. Positioned adjacent to the list of documents is a checklist that includes all the pertinent documentation that is to be provided to regulatory authorities, the media, and/or affected individuals. As the required data are uploaded, each required data category is noted with a green check mark. Missing elements can be easily determined and uploaded.

It is noteworthy to mention that the on-time reporting of required incident data may be paramount in determining compliance and good faith on the part of an entrusted entity. Consequently, failure to meet required notification deadlines may result in fines and other regulatory punishment.

FIG. 12 illustrates an upload page 1200 that may be utilized by an entrusted entity to upload and categorize required compliance information (e.g., documents shown in FIG. 11). Files may be tagged with metadata linking them to the related federal and states risk assessments before they are stored in a content repository or transmitted to an appropriate party.

FIG. 13 illustrates an exemplary time stamped notation and actions page 1300 that displays notes entered into the system by a particular end user. Actions may include a note that a particular employee is to be retrained and certified. Any type of related action such as a remedial action, uploading of a file, or other notification and/or compliance related action may be noted and associated with a particular risk assessment.

Figure 14:
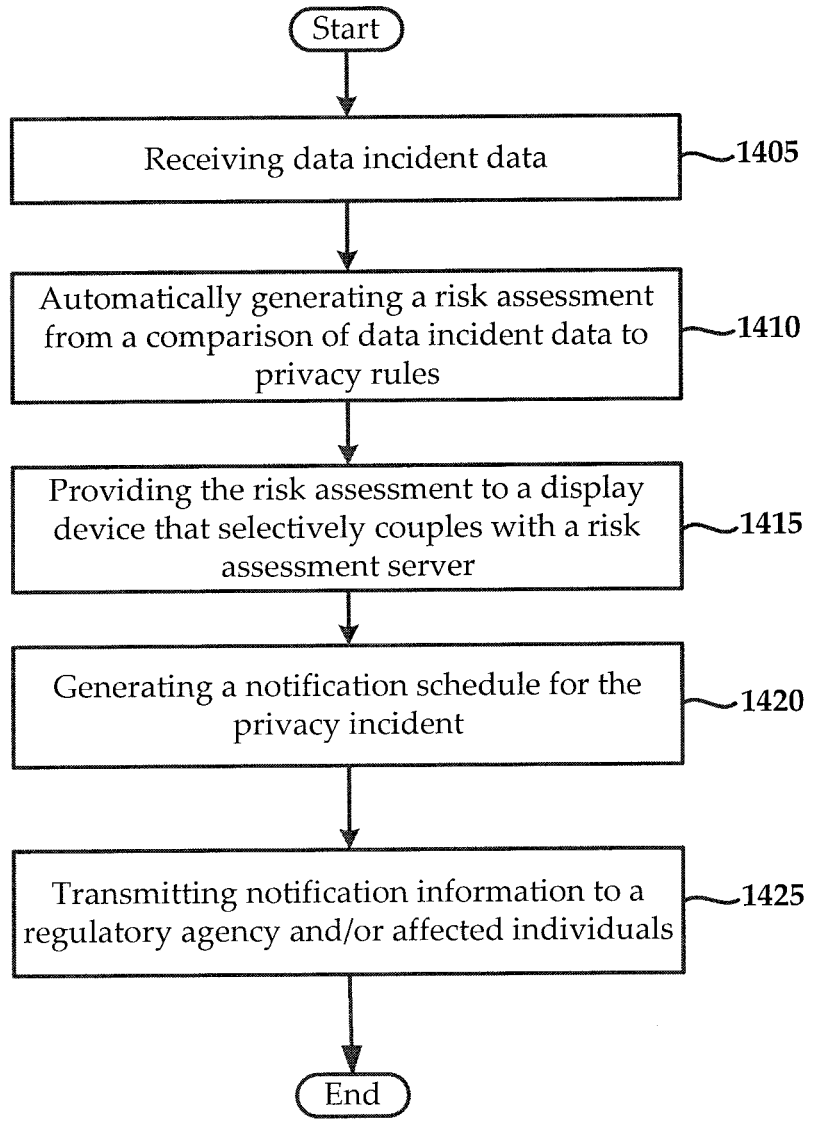
FIG. 14 is a flowchart of an exemplary method for managing a data incident.

FIG. 14 illustrates a flowchart of an exemplary method for managing a data incident. The method may include a step 1405 of receiving data incident data. The data incident data may include information that pertains or corresponds to the data incident. Also, the method may include a step 1410 of automatically generating a risk assessment from a comparison of data incident data to privacy rules. The privacy rules may comprise at least one federal rule and at least one state rule, where each of the rules defining requirements associated with data incident notification laws. Additionally, the comparison may include modeling the data incident data against privacy rules. Also, the method may include a step 1415 of providing the risk assessment to a display device that selectively couples with a risk assessment server. It is noteworthy to mention that the risk assessment may include a visual representation of the risk associated with a data incident relative to the privacy rules.

Additionally, for data incidents that violate a privacy rule (either state or federal) the method may include a step 1420 of generating a notification schedule for the data incident, along with an optional step 1425 of transmitting notification information to a regulatory agency and/or affected individuals (e.g. those who's PII/PHI has been compromised).

Figure 15:
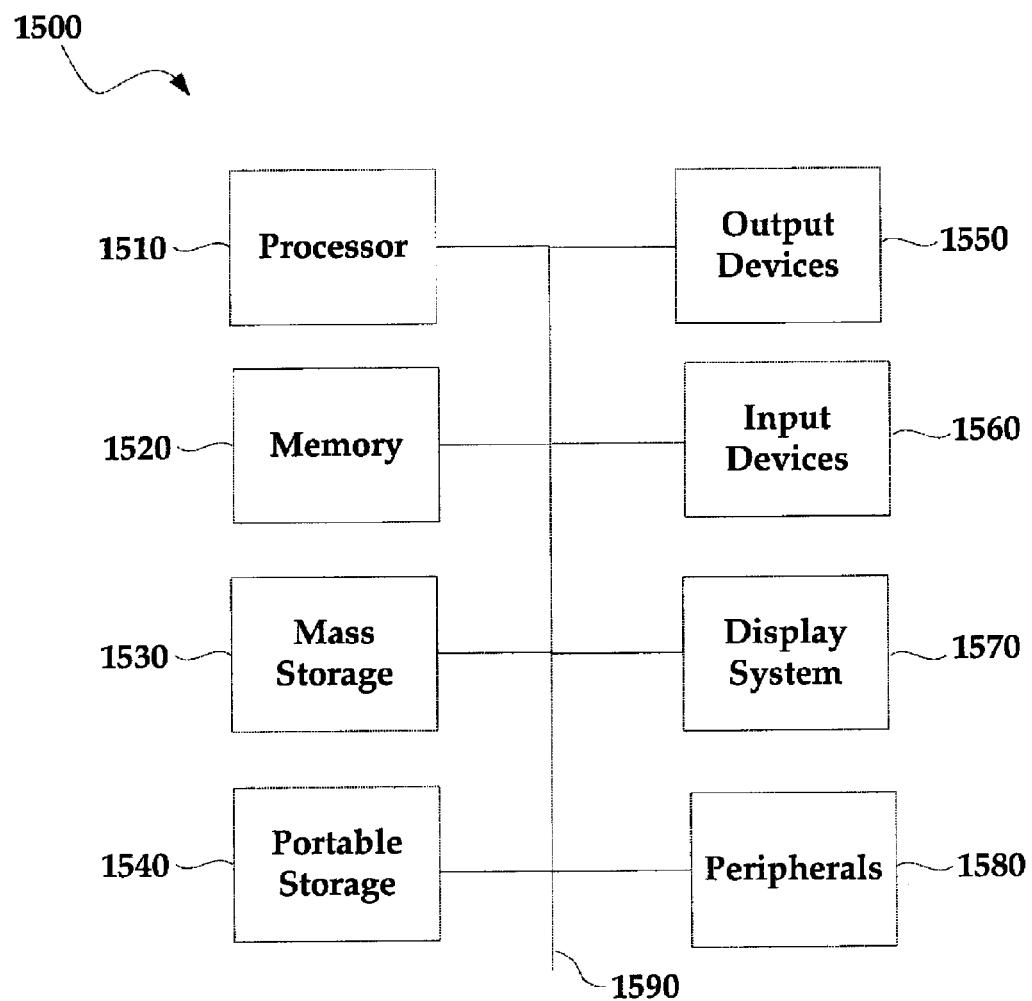
FIG. 15 illustrates an exemplary computing device that may be used to implement embodiments according to the present technology.

FIG. 15 illustrates an exemplary computing device 1500 that may be used to implement an embodiment of the present technology. The computing device 1500 of FIG. 15 (or portions thereof) may be implemented in the context of system 105 (FIG. 1). The computing device 1500 of FIG. 15 includes one or more processors 1510 and main memory 1520. Main memory 1520 stores, in part, instructions and data for execution by processor 1510. Main memory 1520 may store the executable code when in operation. The computing device 1500 of FIG. 15 further includes a mass storage device 1530, portable storage device 1540, output devices 1550, user input devices 1560, a display system 1570, and peripheral devices 1580.

The components shown in FIG. 15 are depicted as being connected via a single bus 1590. The components may be connected through one or more data transport means. Processor 1510 and main memory 1520 may be connected via a local microprocessor bus, and the mass storage device 1530, peripheral device(s) 1580, portable storage device 1540, and display system 1570 may be connected via one or more input/output (I/O) buses.

The Mass storage device 1530, which may be implemented with a magnetic disk drive or an optical disk drive, is a non-volatile storage device for storing data and instructions for use by processor 1510. Mass storage device 1530 may store the system software for implementing embodiments of the present invention for purposes of loading that software into main memory 1520.

Portable storage device 1540 operates in conjunction with a portable non-volatile storage medium, such as a floppy disk, compact disk, digital video disc, or USB storage device, to input and output data and code to and from the computing device 1500 of FIG. 15. The system software for implementing embodiments of the present invention may be stored on such a portable medium and input to the computing device 1500 via the portable storage device 1540.

Input devices 1560 provide a portion of a user interface. Input devices 1560 may include an alphanumeric keypad, such as a keyboard, for inputting alpha-numeric and other information, or a pointing device, such as a mouse, a trackball, stylus, or cursor direction keys. Additionally, the computing device 1500 as shown in FIG. 15 includes output devices 1550. Suitable output devices include speakers, printers, network interfaces, and monitors.

Display system 1570 may include a liquid crystal display (LCD) or other suitable display device. Display system 1570 receives textual and graphical information, and processes the information for output to the display device.

Peripherals 1580 may include any type of computer support device to add additional functionality to the computer system. Peripheral device(s) 1580 may include a modem or a router.

The components provided in the computing device 1500 of FIG. 15 are those typically found in computer systems that may be suitable for use with embodiments of the present invention and are intended to represent a broad category of such computer components that are well known in the art. Thus, the computing device 1500 of FIG. 15 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, Android, iPhone OS and other suitable operating systems. The computing device 1500 may also utilize web browser applications that display the web-based graphical user interfaces described herein. Exemplary web browser applications may include, but are not limited to, Internet Explorer, Firefox, Safari, Chrome, and other web browser applications that would be known to one of ordinary skill in the art with the present disclosure before them. Moreover, when the computing device 1500 is a mobile computing device, the computing device 1500 may likewise include mobile web browser applications.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for managing a data incident, comprising:
receiving, via a risk assessment server, in response to an occurrence of the data incident, data incident data that comprises information corresponding to the data incident, the data incident further comprising intentional or unintentional release of personally identifiable information to an untrusted environment;
automatically generating, via the risk assessment server, a risk assessment from a comparison of the data incident data to privacy rules, the privacy rules comprising at least one federal rule and at least one state rule, each of the rules defining requirements associated with data incident notification laws;
providing, via the risk assessment server, the risk assessment to a display device that selectively couples with the risk assessment server; and further comprising generating a notification schedule when the comparison indicates that the data incident violates at least one of the at least one federal rule, the at least one state rule, or combinations thereof.

2. The method according to claim 1, wherein receiving data incident data comprises:
providing one or more questions to the display device that elicit information corresponding to the data incident;
receiving responses to the one or more questions;
providing the responses to the display device; and
receiving confirmation of at least a portion of the responses.

3. The method according to claim 1, further comprising:
receiving one or more selections of one or more states;
selecting one or more state statutes based upon the one or more selections; and
generating at least one state rule based upon a selected state statute.

4. The method according to claim 1, wherein the at least one federal rule comprises a federal statute that governs privacy breaches relative to at least one of protected health information (PHI), personally identifiable information (PII), or combinations thereof.

5. The method according to claim 1, wherein the at least one state rule comprises a state statute that governs privacy breaches relative to at least one of protected health information (PHI), personally identifiable information (PII), or combinations thereof.

6. The method according to claim 1, wherein the risk assessment comprises a risk level that indicates a severity of the data incident relative to at least one of the at least one federal rule, the at least one state rule, or combinations thereof.

7. The method according to claim 6, wherein the risk level is associated with a color, wherein a hue of the color is associated with the severity of the data incident as determined by the comparison.

8. The method according to claim 1, wherein the risk assessment defines one or more exceptions that apply to at least a portion of the data incident data based upon the comparison.

9. The method according to claim 1, wherein the risk assessment comprises at least a portion of the at least one state rule.

10. The method according to claim 1, further comprising providing an alert to the display device when the comparison indicates that the data incident violates at least one of the at least one federal rule, the at least one state rule, or combinations thereof.

11. The method according to claim 1, wherein the notification schedule comprises notification dates that are based upon a violated statute, along with notification requirements that describe information that is to be provided to a regulatory agency.

12. The method according to claim 11, further comprising receiving the information that is to be provided to a regulatory agency and storing the same in a content repository associated with the risk assessment server.

13. The method according to claim 1, wherein the comparison includes modeling of the data incident data to the privacy rules to determine a severity and a data sensitivity of the data incident.

14. The method according to claim 1, wherein the comparison comprises:
    modeling the data incident data to determine severity and data sensitivity of the data incident by evaluating the data incident data relative to the at least one state rule; and
    generating a state specific risk assessment from the modeling.

15. A risk assessment server for managing a data incident, the server comprising:
    a memory for storing executable instructions;
    a processor for executing the instructions;
    an input module stored in memory and executable by the processor to receive in response to an occurrence of the data incident, data incident data, the data incident data comprising information corresponding to the data incident, the data incident further comprising intentional or unintentional release of personally identifiable information to an untrusted environment;
    a risk assessment generator stored in memory and executable by the processor to generate a risk assessment from a comparison of the data incident data to privacy rules, the privacy rules comprising at least one federal rule and at least one state rule, each of the rules defining requirements associated with data incident notification laws;
    a user interface module stored in memory and executable by the processor to provide the risk assessment to a display device that selectively couples with the risk assessment server; and further comprising a notification module generating a notification schedule when the comparison indicates that the data incident violates at least one of the at least one federal rule, the at least one state rule, or combinations thereof.

16. The server according to claim 15, wherein the input module further:
    generates one or more questions to the display device that elicit data incident data corresponding to the data incident;
    receives responses to the one or more questions;
    generates a summary of responses to the one or more questions;
    provides the summary to the display device; and
    receives confirmation of the summary.

17. The server according to claim 15, wherein the input module further:
    receives one or more selections of one or more states; and
    selects the at least one state rule based upon the one or more selections.

18. The server according to claim 15, further comprising a rule generator stored in memory and executable by the processor to:
    generate the at least one federal rule from a federal statute that governs privacy breaches relative to protected health information (PHI); or
    generate the at least one state rule from a state statute that governs privacy breaches relative to at least one of personally identifiable information (PII), PHI, or combinations thereof.

19. The server according to claim 15, wherein the risk assessment generator generates a risk assessment that comprises a risk level that indicates a severity of the data incident relative to at least one of the at least one federal rule, the at least one state rule, or combinations thereof.

20. The server according to claim 15, wherein the risk assessment generator creates a notification that one or more exceptions apply to at least a portion of the data incident data based upon modeling.

21. The server according to claim 15, further comprising a reporting module stored in memory and executable by the processor to receive information that is to be provided to a regulatory agency and stores the same in a content repository associated with the risk assessment server.

22. A method for managing a data incident, comprising:
    receiving, via a risk assessment server, in response to an occurrence of the data incident, data incident data that comprises information corresponding to the data incident, the data incident further comprising intentional or unintentional release of personally identifiable information to an untrusted environment;
    automatically generating, via the risk assessment server, a risk assessment from a comparison of the data incident data to privacy rules, the privacy rules comprising at least one federal rule and at least one state rule, each of the rules defining requirements associated with data incident notification laws;
    providing, via the risk assessment server, the risk assessment to a display device that selectively couples with the risk assessment server;
    receiving one or more selections of one or more states;
    selecting one or more state statutes based upon the one or more selections;
    generating at least one state rule based upon a selected state statute; and further comprising generating a notification schedule when the comparison indicates that the data incident violates at least one of the at least one federal rule, the at least one state rule, or combinations thereof.

23. The method according to claim 22, further comprising providing an alert to the display device when the comparison indicates that the data incident violates at least one of the at least one federal rule, the at least one state rule, or combinations thereof.

24. The method according to claim 22, wherein the notification schedule comprises notification dates that are based upon a violated statute, along with notification requirements that describe information that is to be provided to a regulatory agency.

25. The method according to claim 24, further comprising receiving the information that is to be provided to a regulatory agency and storing the same in a content repository associated with the risk assessment server.

26. A risk assessment server for managing a data incident, the server comprising:
    a memory for storing executable instructions;
    a processor for executing the instructions;

an input module stored in memory and executable by the processor to receive in response to an occurrence of the data incident, data incident data, the data incident data comprising information corresponding to the data incident, the data incident further comprising intentional or unintentional release of personally identifiable information to an untrusted environment;

a risk assessment generator stored in memory and executable by the processor to generate a risk assessment from a comparison of the data incident data to privacy rules, the privacy rules comprising at least one federal rule and at least one state rule, each of the rules defining requirements associated with data incident notification laws;

a user interface module stored in memory and executable by the processor to provide the risk assessment to a display device that selectively couples with the risk assessment server; and a rule generator stored in memory and executable by the processor to:

generate the at least one federal rule from a federal statute that governs privacy breaches relative to protected health information (PHI); or generate the at least one state rule from a state statute that governs privacy breaches relative to at least one of personally identifiable information (PII), PHI, or combinations thereof; and further comprising a notification module generating a notification schedule when the comparison indicates that the data incident violates at least one of the at least one federal rule, the at least one state rule, or combinations thereof.

* * * * *